US011334969B2

(12) United States Patent
Graziosi

(10) Patent No.: US 11,334,969 B2
(45) Date of Patent: May 17, 2022

(54) POINT CLOUD GEOMETRY PADDING

(71) Applicant: SONY CORPORATION, Tokyo (JP)

(72) Inventor: Danillo Graziosi, San Jose, CA (US)

(73) Assignee: Sony Group Corporation, Tokyo (JP)

( * ) Notice: Subject to any disclaimer, the term of this patent is extended or adjusted under 35 U.S.C. 154(b) by 61 days.

(21) Appl. No.: 16/655,685

(22) Filed: Oct. 17, 2019

(65) Prior Publication Data

US 2020/0302578 A1 Sep. 24, 2020

Related U.S. Application Data

(60) Provisional application No. 62/820,723, filed on Mar. 19, 2019.

(51) Int. Cl.
*G06T 9/00* (2006.01)
*G06T 5/00* (2006.01)

(52) U.S. Cl.
CPC ............... *G06T 5/005* (2013.01); *G06T 9/00* (2013.01); *G06T 2207/10028* (2013.01)

(58) Field of Classification Search
None
See application file for complete search history.

(56) References Cited

U.S. PATENT DOCUMENTS

2019/0087979 A1 3/2019 Mammou et al.

FOREIGN PATENT DOCUMENTS

CN 107610061 A 1/2018

OTHER PUBLICATIONS

Yann Quinsat and Claire Lartigue, "Filling holes in digitized point cloud using a morphing-based approach to preserv volume characteristics", HAL archives-ouverties, International Journal of Advanced Manufacturing Technology, Springer Verlag, 2015, 81 (1), pp. 411-421. 10.1007/s00170-015-7185-0. hal-01150322.
Danillo Graziosi et al, "[V-PCC] New Contribution on Geometry Padding", 126. MPEG Metting; Mar. 25, 2019-Mar. 29, 2019; Geneva; (Motion Picture Expert Group or ISO/IEC JTC1/SC29/WG11), No. m47496 Mar. 23, 2019 (Mar. 23, 2019), XP030205199, Retrieved from the Internet: URL:http://phenix.int-evry.fr/mpeg/doc_end_user/documents/126_Geneva/wg11/m47496-v2-m47496_v2.zip m47496_v2.docx [retrieved on Mar. 23, 2019] the whole document.
"V-PCC Codec description" 125. MPEG Meeting; Jan. 14, 2019-Jan. 18, 2019; Marrakech; (Motion Picture Expert Group or ISO/IEC JTC1/SC29/WG11), No. n18190 Mar. 13, 2019 (Mar. 13, 2019), XP030212735, Retrieved from the Internet; URL:http://phenix.int-evry.fr/mpeg/doc_end_user/documents/125_Marrakech/wg11/w1890.zip N18190_VPCC_TMv5_AlgorithmDiscription_v1.docx [retrieved on Mar. 13, 2019] the whole document.
Li Li et al.,: "Co-projection-plane based 3-D padding for polyhedron for 360-degree video", 2017 IEEE International Conference on Multimedia and Expo (ICME), IEEE, Jul. 10, 2017 (Jul. 10, 2017)m pp. 55-60, XP033146614, DOI: 10.1109/ICME.2017.8019393 [Retrieved on Aug. 28, 2017] the whole document.

(Continued)

*Primary Examiner* — Kyle Zhai
(74) *Attorney, Agent, or Firm* — Haverstock & Owens, a Law Corporation

(57) ABSTRACT

A method of point cloud geometry padding is described herein. The method searches for a reconstruction point in a compressed occupancy map to perform the geometry padding instead of using an uncompressed occupancy map.

16 Claims, 4 Drawing Sheets

(56) References Cited

OTHER PUBLICATIONS

Hanhart P et al.: "AHG8: References samples derivation using geometry padding for intra coding", 4. JVET Meeting; Oct. 15, 2016-Oct. 21, 2016; Chengdu; (The Joing Video Exploration Team of ISO/IEC JTC1/SC29/WG11 and ITU-T SG.16); URL: http://phenix.int-evry.fr/jvet/,, No. JVET-D0092, Oct. 6, 2016 (Oct. 6, 2016), XP030150329, the whole document.
The International Search Report dated Jun. 5, 2020 for PCT Application No. PCT/IB2020/052034.

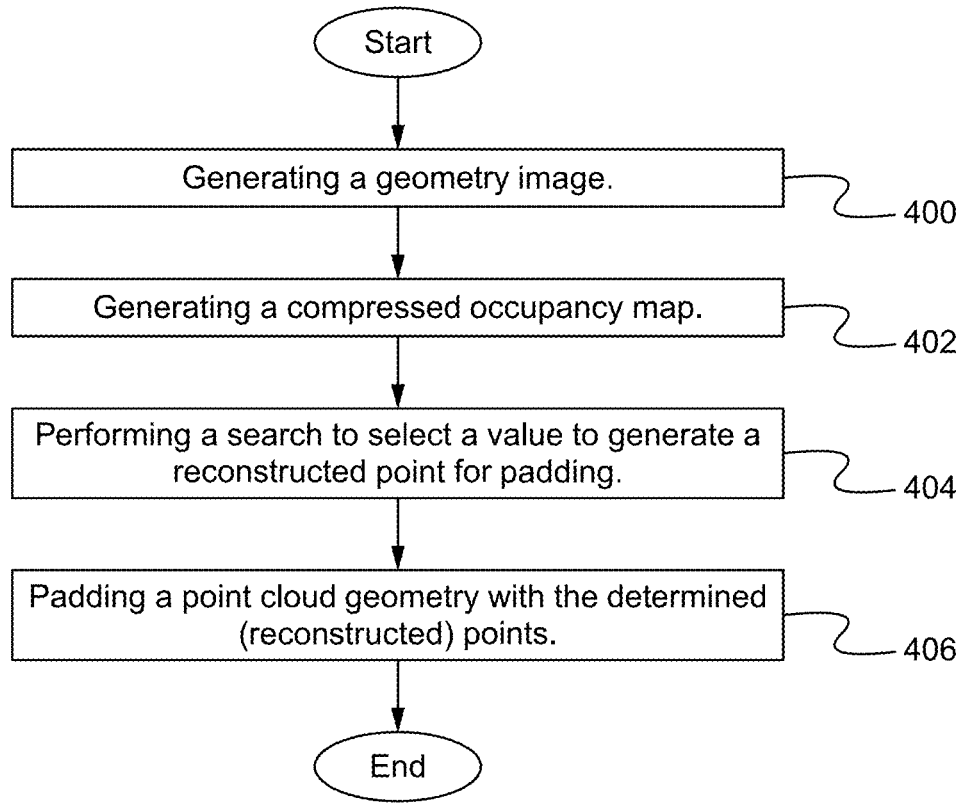

Fig. 3

```
                    Start
                      │
                      ▼
    ┌─────────────────────────────────────┐
    │   Generating a geometry image.      │──── 400
    └─────────────────────────────────────┘
                      │
                      ▼
    ┌─────────────────────────────────────┐
    │ Generating a compressed occupancy map.│──── 402
    └─────────────────────────────────────┘
                      │
                      ▼
    ┌─────────────────────────────────────────┐
    │ Performing a search to select a value to │
    │ generate a reconstructed point for padding.│──── 404
    └─────────────────────────────────────────┘
                      │
                      ▼
    ┌─────────────────────────────────────────┐
    │ Padding a point cloud geometry with the  │
    │ determined (reconstructed) points.       │──── 406
    └─────────────────────────────────────────┘
                      │
                      ▼
                    End
```

Fig. 4

POINT CLOUD GEOMETRY PADDING

CROSS-REFERENCE TO RELATED APPLICATION(S)

This application claims priority under 35 U.S.C. § 119(e) of the U.S. Provisional Patent Application Ser. No. 62/820,723, filed Mar. 19, 2019 and titled, "POINT CLOUD GEOMETRY PADDING," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

Point clouds have been considered as a candidate format for transmission of 3D data, either captured by 3D scanners, LIDAR sensors, or used in popular applications such as Virtual Reality/Augmented Reality (VR/AR). Point Clouds are a set of points in 3D space. Besides the spatial position (X,Y,Z), each point usually has associated attributes, such as color (R,G,B) or even reflectance and temporal timestamps (e.g., in LIDAR images). In order to obtain a high fidelity representation of the target 3D objects, devices capture point clouds in the order of thousands or even millions of points. Moreover, for dynamic 3D scenes used in VR/AR application, every single frame often has a unique dense point cloud, which results in the transmission of several millions of point clouds per second. For a viable transmission of such a large amount of data, compression is often applied.

In 2017, MPEG issued a call for proposal (CfP) for compression of point clouds. After evaluation of several proposals, MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. The method has proven to be more efficient than native 3D coding and is able to achieve competitive bitrates at acceptable quality.

When coding point clouds, TMC2 encodes auxiliary information related to the patch projection, such as patch position in the 2D canvas image and bounding box size. For temporal coding of auxiliary information, patch matching between patches from current point cloud and patches from the immediately decoded point cloud is used for prediction. The procedure is limited to the immediate neighbor and includes performing delta coding for all the frames in the sequence.

The state-of-the-art in point cloud compression using video encoders represent point clouds as 3D patches and encode a 2D image formed by the projection of geometry and attributes into a 2D canvas. Additionally, the 2D image has many empty spaces that are filled with an image padding process. The empty spaces are identified by the occupancy map. Currently, the image padding process is performing a 2D dilation, which smoothly extends the boundaries of the blocks into the empty positions. This process is considering only 2D information. Since the occupancy map is coded as well, some of the empty positions will be incorporated into the reconstructed point cloud, due to changes in the occupancy map. Therefore, positions that were previously filled with the padding algorithm may be incorporated into the reconstructed point cloud, which could cause some geometric distortions, since the padding algorithm only considers the 2D structure of the image.

SUMMARY OF THE INVENTION

A method of point cloud geometry padding is described herein. The method searches for a reconstruction point in a compressed occupancy map to perform the geometry padding instead of using an uncompressed occupancy map.

In one aspect, a method programmed in a non-transitory memory of a device comprises generating geometry images from a point cloud, placing the geometry images on a 2D canvas and filling empty spaces on the 2D canvas with a padding method which considers a 3D position of newly added points due to lossy compression of an occupancy map. The padding method comprises a search in a 3D space for a value that, when reconstructed, is as close as possible to the point cloud. The method further comprises adding new values to a reconstructed point cloud due to the lossy compression of the occupancy map. The method further comprises performing a search in a 3D space by searching a limited range of values centered around a representative value of local points in the 2D canvas. Performing the search in the 3D space comprises starting with an average of three neighboring points. Performing the search in the 3D space comprises adding or subtracting values sequentially and repetitively comparing values to determine a replacement point. Performing the search in the 3D space comprises only searching for points within a specified range. The method further comprises generating a compressed geometry image. The method further comprises generating a compressed bitstream for the point cloud.

In another aspect, an apparatus comprises a non-transitory memory for storing an application, the application for: generating geometry images from a point cloud, placing the geometry images on a 2D canvas and filling empty spaces on the 2D canvas with a padding method which considers a 3D position of newly added points due to lossy compression of an occupancy map and a processor coupled to the memory, the processor configured for processing the application. The padding method comprises a search in a 3D space for a value that, when reconstructed, is as close as possible to the point cloud. The application is further configured for adding new values to a reconstructed point cloud due to the lossy compression of the occupancy map. The application is further configured for performing a search in a 3D space by searching a limited range of values centered around a representative value of local points in the 2D canvas. Performing the search in the 3D space comprises starting with an average of three neighboring points. Performing the search in the 3D space comprises adding or subtracting values sequentially and repetitively comparing values to determine a replacement point. Performing the search in the 3D space comprises only searching for points within a specified range. The application is further configured for generating a compressed geometry image. The application is further configured for generating a compressed bitstream for the point cloud.

In another aspect, a system comprises one or more cameras for acquiring three dimensional content and an encoder for encoding the three dimensional content by: generating geometry images from the three dimensional content, placing the geometry images on a 2D canvas and filling empty spaces on the 2D canvas with a padding method which considers a 3D position of newly added points due to lossy compression of an occupancy map. The padding method comprises a search in a 3D space for a value that, when reconstructed, is as close as possible to the point cloud. The encoder is further configured for adding new values to a reconstructed point cloud due to the lossy compression of the occupancy map. The encoder is further configured for performing a search in a 3D space by searching a limited range of values centered around a representative value of local points in the 2D canvas. Performing the search in the 3D space comprises starting with an average of three neighboring points. Performing the search in the 3D space comprises adding or subtracting values sequentially and repetitively comparing values to determine a replacement point. Performing the search in the 3D space comprises only searching for points within a specified range. The encoder is further configured for generating a compressed geometry image. The encoder is further configured for generating a compressed bitstream for the point cloud.

BRIEF DESCRIPTION OF THE DRAWINGS

FIG. 3 illustrates a diagram of generating a reconstructed point for 3D geometry padding according to some embodiments.

FIG. 4 illustrates a flowchart of a method of implementing point cloud geometry padding according to some embodiments.

DETAILED DESCRIPTION OF THE PREFERRED EMBODIMENT

A novel method of padding geometry images generated from mapping 3D point cloud data into 2D surfaces is described herein. 3D surface patches are used to represent point clouds, perform flexible mapping of 3D patch surface data into 2D canvas images, and fill in empty positions of the geometry image (geometry image padding) by considering 3D information.

Patches representing geometry are placed in a 2D canvas image, then the empty positions are filled (image padding) for efficient compression. However, due to the coding process, some of the empty positions will be incorporated into the reconstructed point cloud. Those positions are able to be identified, and a padding principle is able to be used based on 3D information to fill in those positions.

The utilization of 3D information to perform 2D image padding is described herein. Past image padding (or also image inpainting) algorithms utilized the 2D structure of the image. Image padding is performed using the 3D space.

Figure 1:
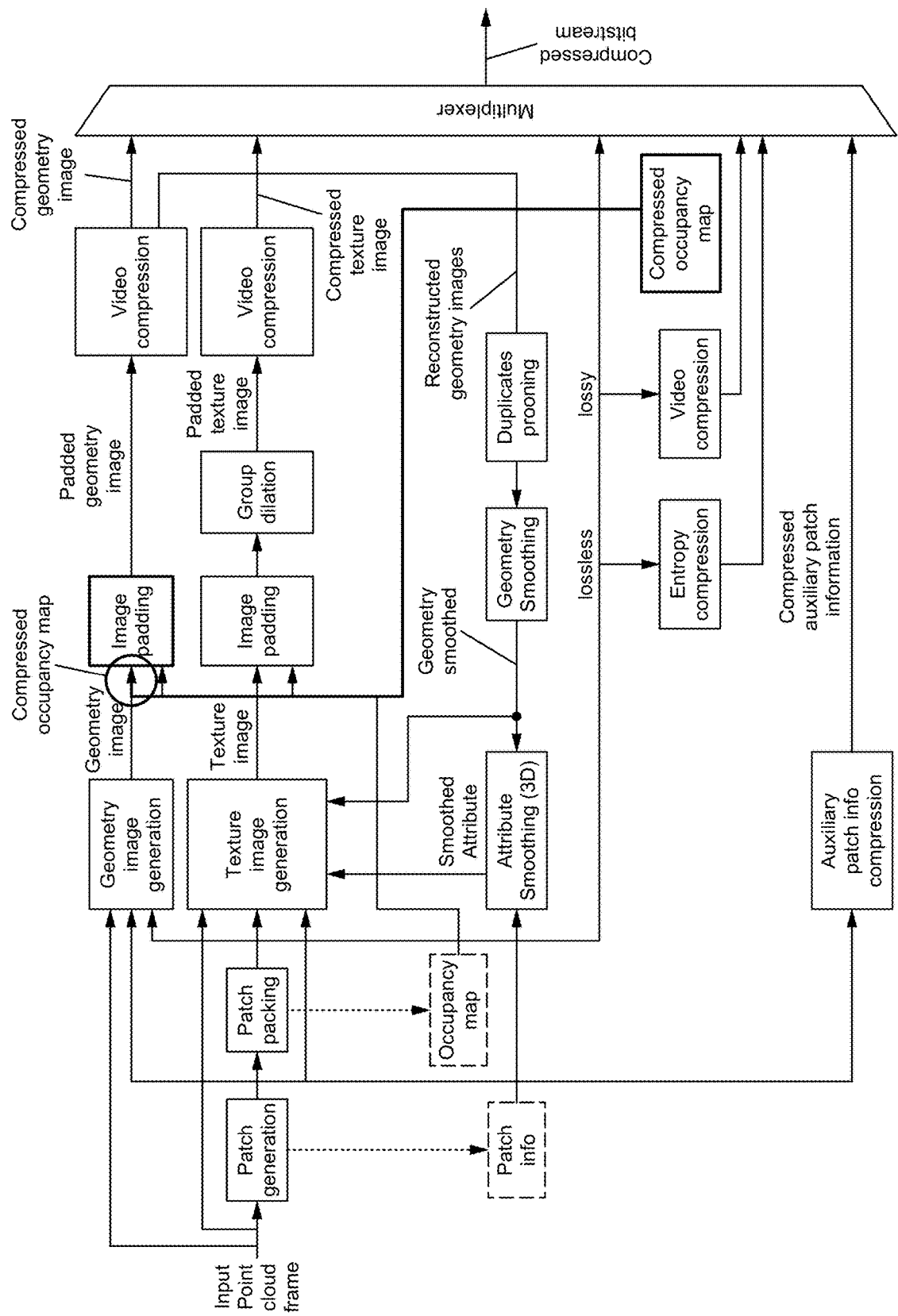
FIG. 1 illustrates a diagram of a schematic for performing point cloud coding according to some embodiments.

FIG. 1 illustrates a diagram of a schematic for performing point cloud coding according to some embodiments. The components for point cloud coding are able to be standard or modified components configured to perform their specific tasks. For brevity, the details of the point cloud coding components in general are not described herein. Image/ geometry padding is described further herein. Instead of using data from an uncompressed occupancy map, data from a compressed occupancy map is utilized for image padding. The 3D reconstructed values for the positions that will be added due to occupancy map coding when padding the geometry image are used instead of an original occupancy map. The padded geometry image then goes to video compression and ultimately a compressed bitstream is generated.

Figure 2:
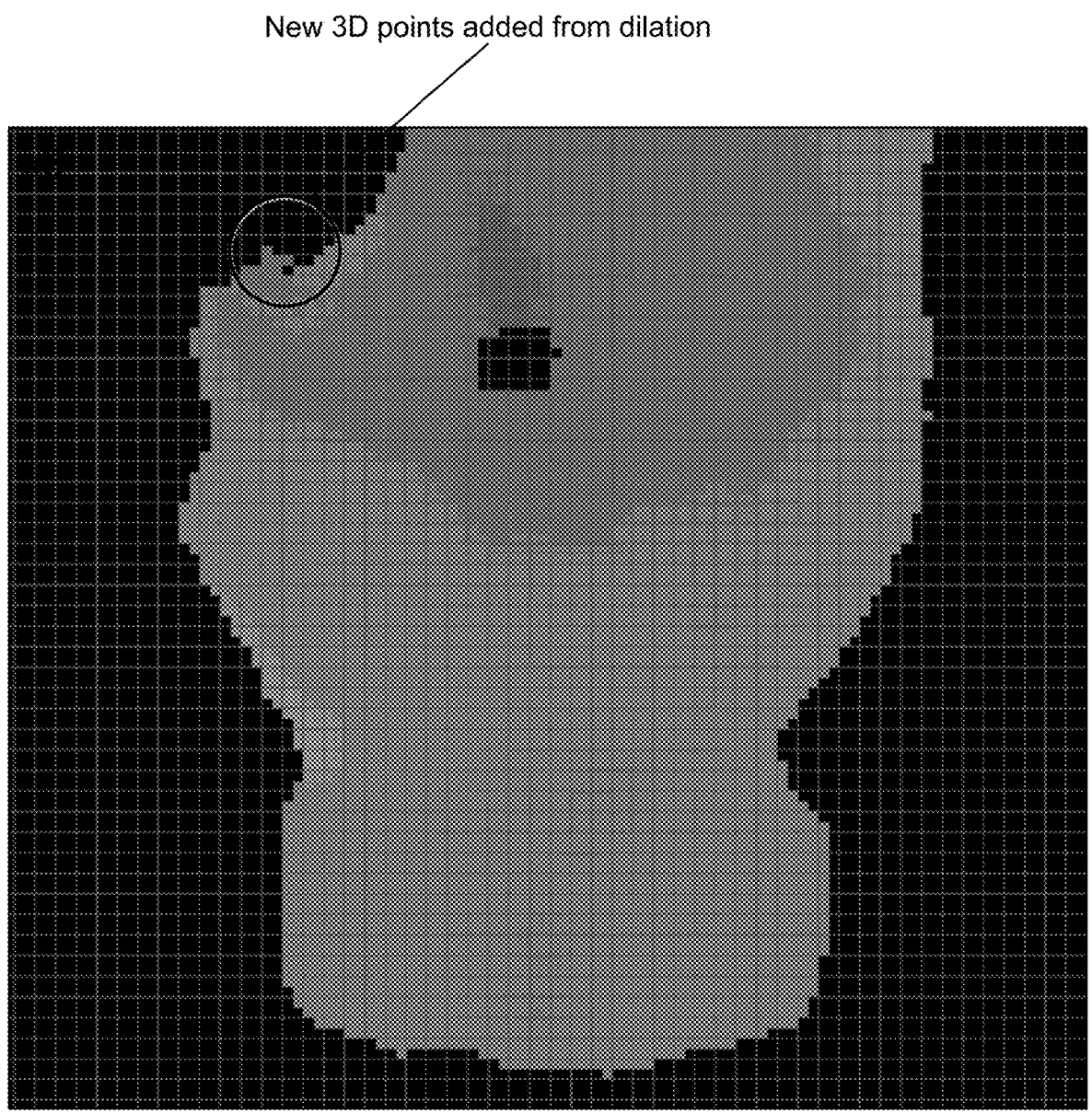
FIG. 2 illustrates an exemplary image with 3D points added according to some embodiments.

FIG. 2 illustrates an exemplary image with 3D points added according to some embodiments. Utilizing the implementation described herein, the geometry image is padded with more accurate points.

FIG. 3 illustrates a diagram of generating a reconstructed point for 3D geometry padding according to some embodiments. The 3D geometry padding includes selecting a value for positions that generate a reconstructed point that is as close as possible to the original point cloud. A search is performed in a range of possible depth values. As shown in FIG. 3, the goal is to determine X. In the past, X was determined by averaging d1, d2, and d3. However, FIG. 3, shows an optimal way of determining X by finding $d_{optimal}$. A search procedure starts at a mean value and then 1 is added or 1 is subtracted, then 2 is added or 2 is subtracted, and so on, to determine if the point is close to the original point cloud. The point may wind up being the same as or different than the mean value. Furthermore, the value is only able to go slightly over or under the average value of d1, d2 and d3.

I(i) is an indicator function, that is 0 if the neighboring position is not available, or 1 if the neighboring position is available. As discussed herein, different starting values are able to be used such as a median value, for example. This is just the starting point for the search range. The criteria for choosing the most appropriate value is determined in the 3D space; the reconstructed value is calculated; and the distance between the value and the original point cloud will determine the choice for the 2D value.

With the geometry padding described herein, the distance between the reconstructed point cloud and the original point cloud is reduced, specifically, between the patches.

FIG. 4 illustrates a flowchart of a method of implementing point cloud geometry padding according to some embodiments. In the step 400, a geometry image is generated. The geometry image is generated in any manner from an input/ original cloud frame. The patches representing the geometry are placed in a 2D canvas image. However, there are empty spaces/positions that should be filled in (image padding) with a padding method that considers the 3D position of newly added points, due to the lossy compression of the occupancy map. The padding method comprises a search in 3D for a value that, when reconstructed, is as close as possible to the original point cloud. The new values are added to the reconstructed point cloud due to the lossy compression of occupancy map, which in some embodiments, may be coded in lower resolution, and when upsampled to the nominal resolution, will add extra points to the reconstructed point cloud. Other lossy compression methods for the occupancy map are also able to be considered. In the step 402, a compressed occupancy map is generated. The compressed occupancy map is generated using video compression. The empty spaces to be filled are identified using the compressed occupancy map. For example, the compressed occupancy map is analyzed to determine any gaps in boundaries of geometries. In the step 404, a search is performed to select a value to generate a reconstructed point for padding. In some embodiments, the search in 3D space is done by searching a limited range of values centered around a representative value of local points in the 2D canvas. For example, consider a location of a newly added point and its neighboring values that belong to the original point cloud. A representative value of the available points is able to be used as a starting point, then values are added/subtracted from this starting point, until the reconstructed value is close enough to the original point cloud. In some embodiments, the average or a similar operation (e.g. median) of available points immediately neighboring to the current location is able to be used as a representative value. For example, if three points (one above, one to the left, and another above-left the current location) are in the original point cloud, they all are able to be used to estimate the initial value for the search in 3D. If only a sub-set of those points are available, the same operation is able to be done with the limited number of neighboring points. Furthermore, the search range is able to be limited, in order to still maintain the similarity with the 2D values, and a good compression capability for the padded geometry image. In the step 406, a point cloud geometry is padded (e.g., filled in) with the determined (reconstructed) points. Specifically, the areas which are empty/open based on the compression are filled in. In some embodiments, fewer or additional steps are implemented. For example, in some embodiments, the method includes generating a compressed geometry image and/or generating a compressed bitstream for the point cloud. In some embodiments, the order of the steps is modified.

Figure 5:
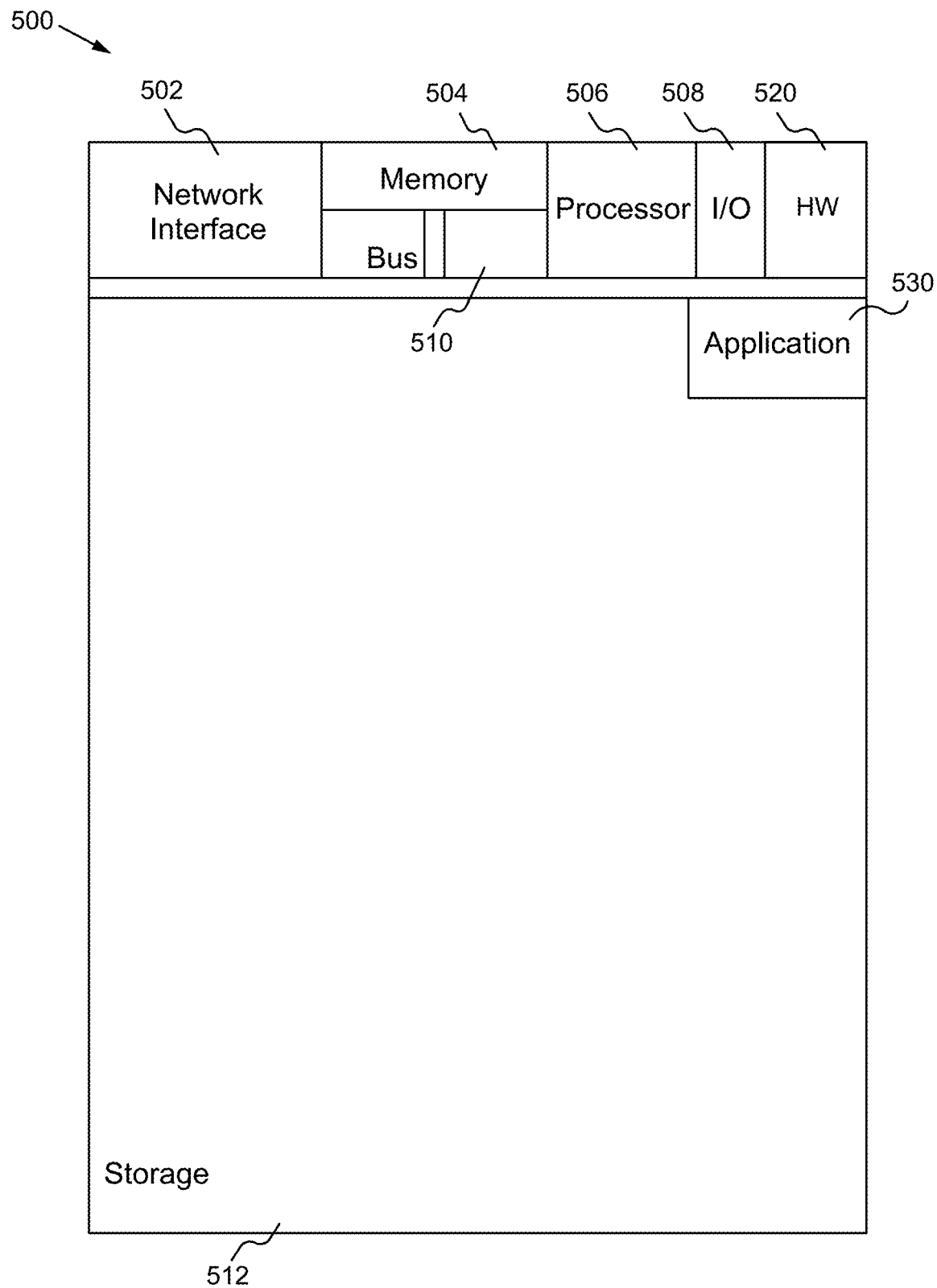
FIG. 5 illustrates a block diagram of an exemplary computing device configured to implement the point cloud geometry padding according to some embodiments.

FIG. 5 illustrates a block diagram of an exemplary computing device configured to implement the point cloud geometry padding according to some embodiments. The computing device 500 is able to be used to acquire, store, compute, process, communicate and/or display information such as images and videos including 3D content. The computing device 500 is able to implement any of the point cloud geometry padding aspects. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, High Definition disc/drive, ultra-HD drive, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, screen, printer, modem, touchscreen, button interface and other devices. Point cloud geometry padding application(s) 530 used to implement the point cloud geometry padding are likely to be stored in the storage device 512 and memory 504 and processed as applications are typically processed. More or fewer components shown in FIG. 5 are able to be included in the computing device 500. In some embodiments, point cloud geometry padding hardware 520 is included. Although the computing device 500 in FIG. 5 includes applications 530 and hardware 520 for the point cloud geometry padding, the point cloud geometry padding is able to be implemented on a computing device in hardware, firmware, software or any combination thereof. For example, in some embodiments, the point cloud geometry padding applications 530 are programmed in a memory and executed using a processor. In another example, in some embodiments, the point cloud geometry padding hardware 520 is programmed hardware logic including gates specifically designed to implement the point cloud geometry padding.

In some embodiments, the point cloud geometry padding application(s) 530 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the point cloud geometry padding method, a device acquires or receives 3D content and processes and/or sends the content in an optimized manner to enable proper, efficient display of the 3D content. The point cloud geometry padding is able to be implemented with user assistance or automatically without user involvement.

In operation, the point cloud geometry padding is more efficient in terms of encoding.

Some Embodiments of Point Cloud Geometry Padding

1. A method programmed in a non-transitory memory of a device comprising:
   generating geometry images from a point cloud;
   placing the geometry images on a 2D canvas; and
   filling empty spaces on the 2D canvas with a padding method which considers a 3D position of newly added points due to lossy compression of an occupancy map.
2. The method of clause 1 wherein the padding method comprises a search in a 3D space for a value that, when reconstructed, is as close as possible to the point cloud.
3. The method of clause 1 further comprising adding new values to a reconstructed point cloud due to the lossy compression of the occupancy map.
4. The method of clause 1 further comprising performing a search in a 3D space by searching a limited range of values centered around a representative value of local points in the 2D canvas.
5. The method of clause 1 wherein performing the search in the 3D space comprises starting with an average of three neighboring points.
6. The method of clause 1 wherein performing the search in the 3D space comprises adding or subtracting values sequentially and repetitively comparing values to determine a replacement point.
7. The method of clause 1 wherein performing the search in the 3D space comprises only searching for points within a specified range.
8. The method of clause 1 further comprising generating a compressed geometry image.
9. The method of clause 1 further comprising generating a compressed bitstream for the point cloud.
10. An apparatus comprising:
    a non-transitory memory for storing an application, the application for:
      generating geometry images from a point cloud;
      placing the geometry images on a 2D canvas; and
      filling empty spaces on the 2D canvas with a padding method which considers a 3D position of newly added points due to lossy compression of an occupancy map; and
    a processor coupled to the memory, the processor configured for processing the application.

11. The apparatus of clause 10 wherein the padding method comprises a search in a 3D space for a value that, when reconstructed, is as close as possible to the point cloud.
12. The apparatus of clause 10 wherein the application is further configured for adding new values to a reconstructed point cloud due to the lossy compression of the occupancy map.
13. The apparatus of clause 10 wherein the application is further configured for performing a search in a 3D space by searching a limited range of values centered around a representative value of local points in the 2D canvas.
14. The apparatus of clause 10 wherein performing the search in the 3D space comprises starting with an average of three neighboring points.
15. The apparatus of clause 10 wherein performing the search in the 3D space comprises adding or subtracting values sequentially and repetitively comparing values to determine a replacement point.
16. The apparatus of clause 10 wherein performing the search in the 3D space comprises only searching for points within a specified range.
17. The apparatus of clause 10 wherein the application is further configured for generating a compressed geometry image.
18. The apparatus of clause 10 wherein the application is further configured for generating a compressed bitstream for the point cloud.
19. A system comprising:
   one or more cameras for acquiring three dimensional content; and
      an encoder for encoding the three dimensional content by:
      generating geometry images from the three dimensional content;
      placing the geometry images on a 2D canvas; and
      filling empty spaces on the 2D canvas with a padding method which considers a 3D position of newly added points due to lossy compression of an occupancy map.
20. The system of clause 19 wherein the padding method comprises a search in a 3D space for a value that, when reconstructed, is as close as possible to the point cloud.
21. The system of clause 19 wherein the encoder is further configured for adding new values to a reconstructed point cloud due to the lossy compression of the occupancy map.
22. The system of clause 19 wherein the encoder is further configured for performing a search in a 3D space by searching a limited range of values centered around a representative value of local points in the 2D canvas.
23. The system of clause 19 wherein performing the search in the 3D space comprises starting with an average of three neighboring points.
24. The system of clause 19 wherein performing the search in the 3D space comprises adding or subtracting values sequentially and repetitively comparing values to determine a replacement point.
25. The system of clause 19 wherein performing the search in the 3D space comprises only searching for points within a specified range.
26. The system of clause 19 wherein the encoder is further configured for generating a compressed geometry image.
27. The system of clause 19 wherein the encoder is further configured for generating a compressed bitstream for the point cloud.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method programmed in a non-transitory memory of a device comprising:
   generating geometry images from a point cloud;
   placing the geometry images on a 2D canvas; and
   filling empty spaces on the 2D canvas with a padding method which considers a 3D position of newly added points due to lossy compression of an occupancy map, wherein the padding method comprises searching in a 3D space for a value that, when reconstructed, minimizes a distance to the point cloud, wherein searching in the 3D space includes searching a limited range of values centered around a representative value of local points in the 2D canvas, wherein searching in the 3D space comprises starting with an average of three neighboring points and then sequentially adding or subtracting values starting with 1 to the average to determine results and repetitively comparing the results with an original point cloud value to determine a reconstructed point, wherein the padding method comprises adding the reconstructed point in an empty space of the empty spaces.
2. The method of claim 1 further comprising adding new values to a reconstructed point cloud due to the lossy compression of the occupancy map.
3. The method of claim 1 wherein searching in the 3D space comprises only searching for points within a specified range.
4. The method of claim 1 further comprising generating a compressed geometry image.
5. The method of claim 1 further comprising generating a compressed bitstream for the point cloud.
6. An apparatus comprising:
   a non-transitory memory for storing an application, the application for:
      generating geometry images from a point cloud;
      placing the geometry images on a 2D canvas; and
      filling empty spaces on the 2D canvas with a padding method which considers a 3D position of newly added points due to lossy compression of an occupancy map, wherein the padding method comprises searching in a 3D space for a value that, when reconstructed, minimizes a distance to the point cloud, wherein searching in the 3D space includes searching a limited range of values centered around a representative value of local points in the 2D canvas, wherein searching in the 3D space comprises starting with an average of three neighboring points and then sequentially adding or subtracting values starting with 1 to the average to determine results and repetitively comparing the results with an original point cloud value to determine a reconstructed point, wherein the padding method comprises adding the reconstructed point in an empty space of the empty spaces; and
   a processor coupled to the memory, the processor configured for processing the application.
7. The apparatus of claim 6 wherein the application is further configured for adding new values to a reconstructed point cloud due to the lossy compression of the occupancy map.

8. The apparatus of claim 6 wherein searching in the 3D space comprises only searching for points within a specified range.

9. The apparatus of claim 6 wherein the application is further configured for generating a compressed geometry image.

10. The apparatus of claim 6 wherein the application is further configured for generating a compressed bitstream for the point cloud.

11. A system comprising:
one or more cameras for acquiring three dimensional content; and
an encoder for encoding the three dimensional content by:
generating geometry images from the three dimensional content;
placing the geometry images on a 2D canvas; and
filling empty spaces on the 2D canvas with a padding method which considers a 3D position of newly added points due to lossy compression of an occupancy map, wherein the padding method comprises searching in a 3D space for a value that, when reconstructed, minimizes a distance to the point cloud, wherein searching in the 3D space includes searching a limited range of values centered around a representative value of local points in the 2D canvas, wherein searching in the 3D space comprises starting with an average of three neighboring points and then sequentially adding or subtracting values starting with 1 to the average to determine results and repetitively comparing the results with an original point cloud value to determine a reconstructed point, wherein the padding method comprises adding the reconstructed point in an empty space of the empty spaces.

12. The system of claim 11 wherein the encoder is further configured for adding new values to a reconstructed point cloud due to the lossy compression of the occupancy map.

13. The system of claim 11 wherein searching in the 3D space comprises only searching for points within a specified range.

14. The system of claim 11 wherein the encoder is further configured for generating a compressed geometry image.

15. The system of claim 11 wherein the encoder is further configured for generating a compressed bitstream for the point cloud.

16. A method programmed in a non-transitory memory of a device comprising:
generating geometry images from a point cloud;
placing the geometry images on a 2D canvas;
filling empty spaces on the 2D canvas with a padding method which considers a 3D position of newly added points due to lossy compression of an occupancy map, wherein the padding method includes selecting a value for positions that generates a reconstructed point that minimizes a distance to the point cloud by starting with an average of three neighboring points and then sequentially adding or subtracting values starting with 1 to the average to determine results and repetitively comparing the results with an original point cloud value to determine the reconstructed point, wherein the empty spaces are each filled with reconstructed points, wherein the padding method comprises adding the reconstructed point in an empty space of the empty spaces.

* * * * *